May 16, 1939.                J. M. SPERZEL                2,158,869
                         AIR CONDITIONING SYSTEM
                         Filed July 13, 1935        4 Sheets-Sheet 1

INVENTOR
JOSEPH M. SPERZEL
BY Moses + Nolte
   his ATTORNEYS

May 16, 1939.  J. M. SPERZEL  2,158,869
AIR CONDITIONING SYSTEM
Filed July 13, 1935  4 Sheets-Sheet 2

INVENTOR
JOSEPH M. SPERZEL
BY
Moses + Nolte
ATTORNEYS

May 16, 1939.  J. M. SPERZEL  2,158,869
AIR CONDITIONING SYSTEM
Filed July 13, 1935   4 Sheets-Sheet 3
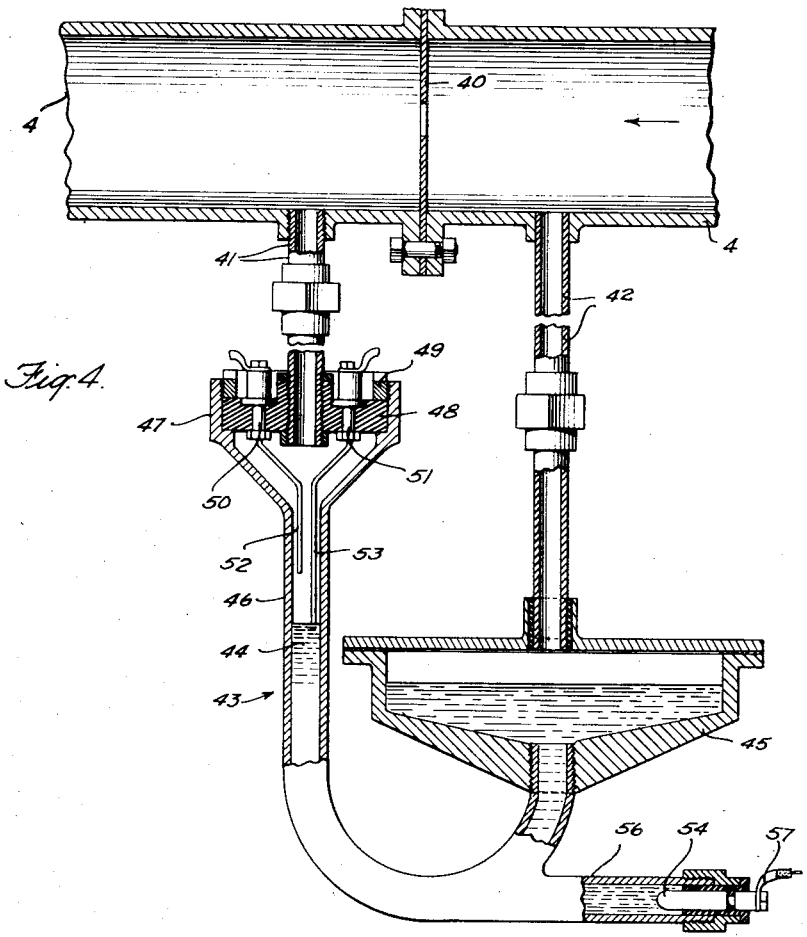
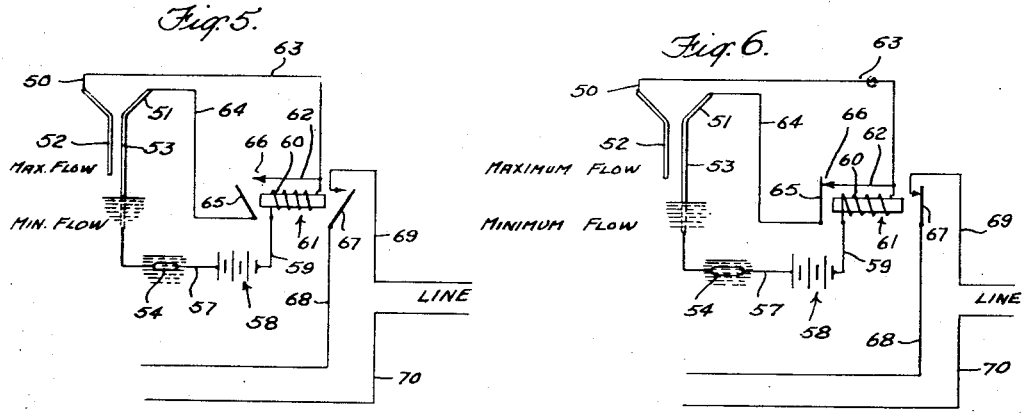
INVENTOR
JOSEPH M. SPERZEL
BY
Moses + Nolte.
ATTORNEYS

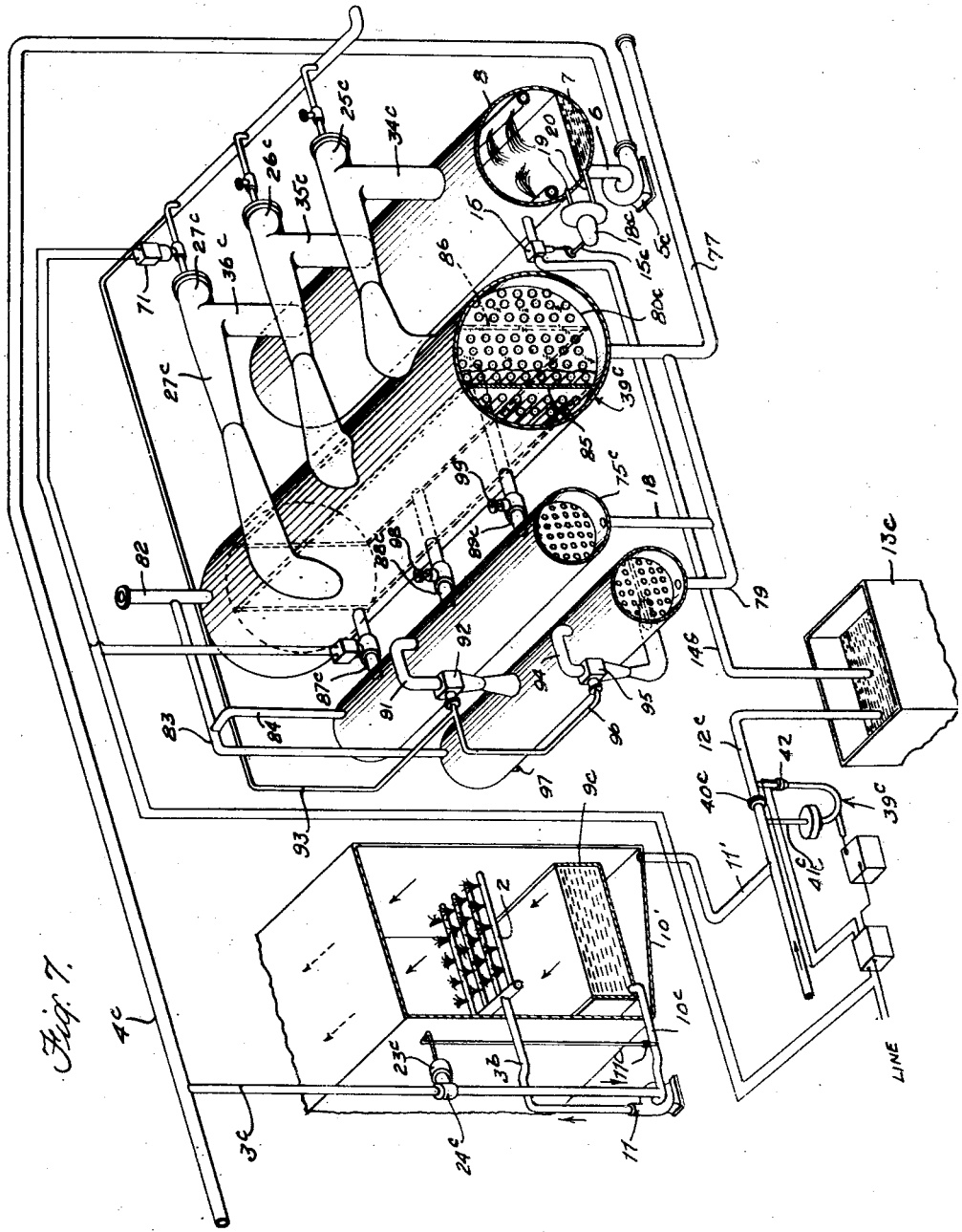

Patented May 16, 1939

2,158,869

UNITED STATES PATENT OFFICE 2,158,869

AIR CONDITIONING SYSTEM

Joseph M. Sperzel, Brooklyn, N. Y.

Application July 13, 1935, Serial No. 31,181

12 Claims. (Cl. 62—2)

This invention relates to air conditioning and more particularly to the temperature control of an air cooling medium and to the control of means for refrigerating said medium, whereby efficient and economical operation may be automatically secured.

In accordance with prior practice it has been the aim to deliver cooling water to a dehumidifying and air cooling chamber at a substantially constant temperature and to vary the rate of water delivery in accordance with the thermal load imposed by the condition of the air to be treated. The chilling of the water is accomplished in an evaporator, the water being delivered to the evaporator through a spray head. This mode of operation has a very serious drawback since the efficiency of the evaporator diminishes as the temperature at which the water is required to be delivered is lowered. For every degree that the temperature of the delivered water is reduced the required evaporator vacuum increases rapidly. The heat removed per pound of water evaporated decreases only slightly per degree of rising temperature whereas the volume of vapor which must be removed per pound of water evaporated decreases rapidly per degree of rising temperature. If a high temperature of water is delivered from the evaporator the evacuator is not required to remove the volume of vapor produced against so great a pressure difference between the evaporator and the condenser as when the water is delivered at a lower temperature, and in addition the volume per pound is smaller while the heat removed per pound remains substantially constant. It is apparent moreover that the keeping of air and non-condensible leakage at a minimum is aided at lower vacuums.

Varying the rate of water delivery through wide limits has the further drawback that the spreading out of the water spray issuing from the spray head is diminished as the rate of flow diminishes so that the surface exposure of the water in the evaporator is impaired whenever the rate of delivery is materially reduced from the designed maximum, and this results in a further loss of efficiency.

In accordance with the present invention it is proposed to maintain the rate of water flow substantially constant but to vary the temperature of the delivered water in accordance with the thermal load imposed by the condition of the air to be treated. Preferably the absolute maximum value of flow will approach the intended or designed maximum value which the evaporator was designed to pass under maximum load.

To this end it is a feature of the invention that provision is made of means for varying the rate of delivery of the water to the air cooling chamber within narrow limits, and of means sensitively responsive to changes in the rate of water flow for increasing the refrigerating effect of the water cooling means when the rate of water flow rises slightly above normal and for again reducing the refrigerating effect when the rate of water flow is diminished.

It is a feature of the present invention that this result is secured by providing a plurality of evacuating devices which may all be operated simultaneously to apply suction to the evaporator, and of means responsive to the slight variations in the rate of water flow for automatically switching one of said devices into and out of operation as required. The evacuating devices which are not subject to automatic control are desirably provided with individual manual control means so that an attendant may disable one or more of such devices at will.

Other objects and advantages will hereinafter appear.

In the drawings forming part of this specification:

Fig. 4 is a fragmentary view in sectional elevation illustrating an electrical form of mechanism for controlling one or more valves;

Fig. 5 is a diagrammatic view illustrating the principles of the mechanism of Fig. 4;

Fig. 6 is a view similar to Fig. 5 but showing the parts in a different position; and Fig. 7 is a view similar to Fig. 1 illustrating a modified embodiment of the invention.

Figure 1:
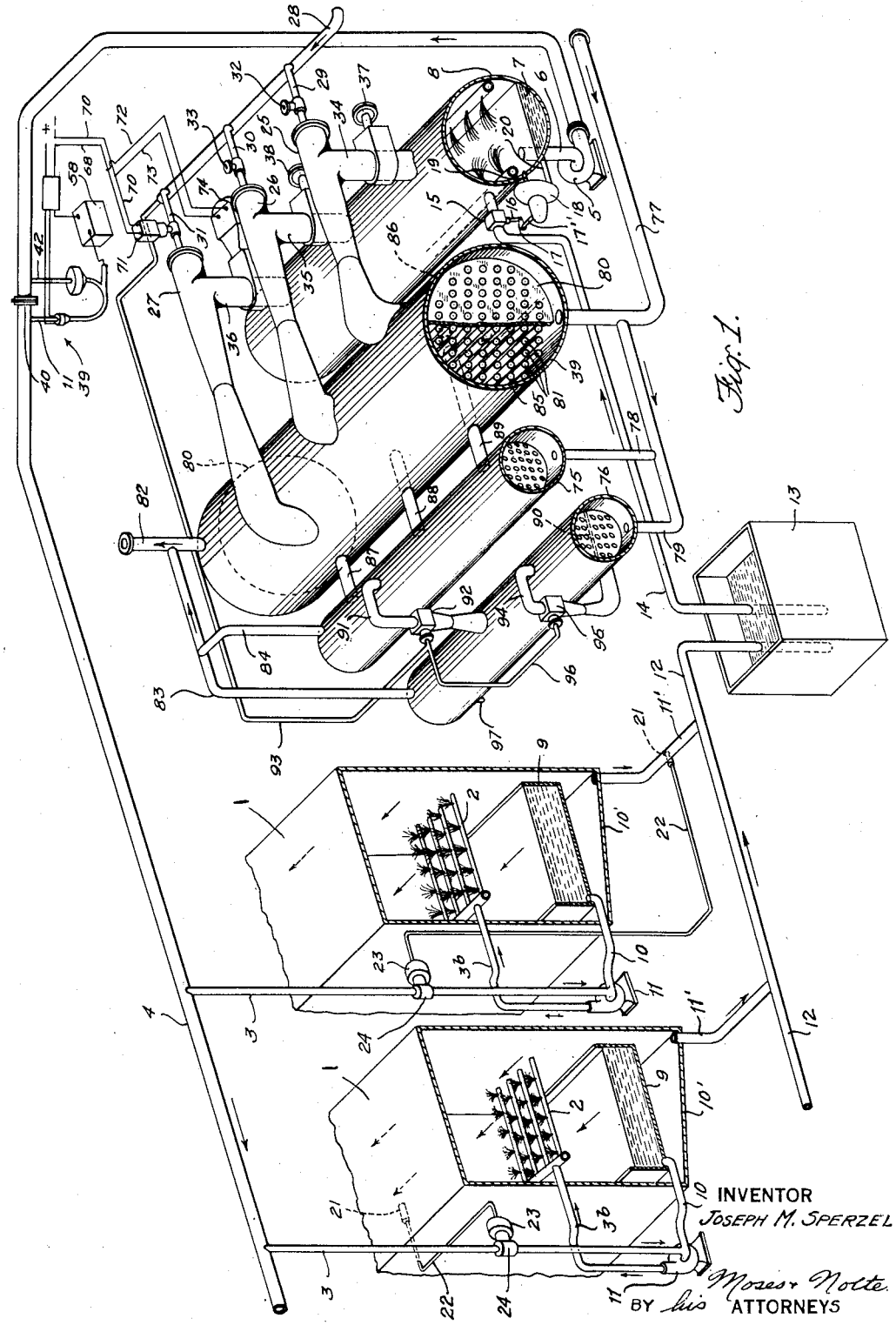
Fig. 1 is a fragmentary, diagrammatic, perspective view illustrating one form of apparatus embodying the invention.
Figure 2:
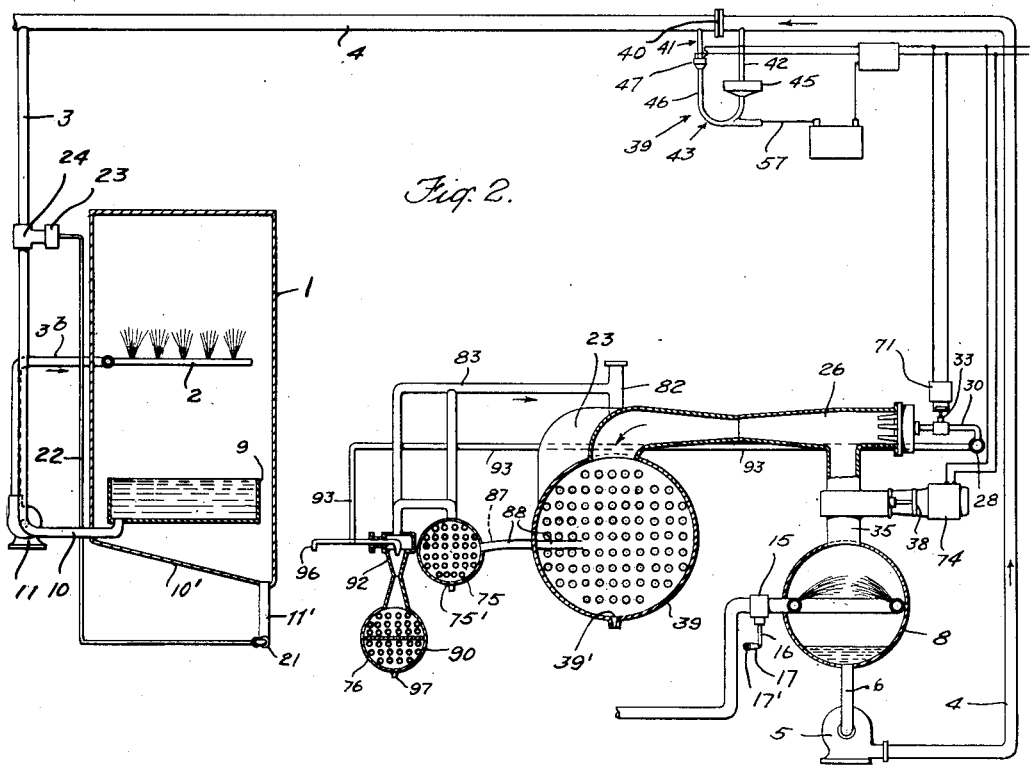
Fig. 2 is a fragmentary, diagrammatic view in sectional elevation, illustrating the principal parts of the mechanism of Fig. 1.

The apparatus of Figs. 1 and 2 is illustrated as comprising a plurality of air cooling conduits or chambers I arranged in parallel. A sprayer head 2 is disposed in each of these chambers, being supplied through branch conduits 3 from a main conduit 4. A conduit 4 runs to a pump 5 which through a conduit 6, draws water 7 from an evaporator tank 8.

The water discharged from a sprayer head 2 is caught in a pan 9 and a portion of it is returned to the sprayer head through a conduit 10, a pump 11 and conduit 3B. Since all of the water withdrawn from the pan 9 by the pump 11 is returned through the sprayer head to the pan, the water overflows from the pan at the same rate at which it is delivered through the conduit 3. The overflow water falls onto an inclined bottom 10' and passes thence through a conduit 11' to a conduit 12 which delivers it to a sump or tank 13, the lower end of the conduit or pipe 12 being submerged in the water in the tank 13. A pipe or conduit 14 which is also submerged deeply in the water of the tank 13 leads to the evaporator and has provided in it a float controlled valve in a valve housing 15. The evacuation of the evaporator causes the water to be sucked through the conduit 14 from the tank 13 whenever the float controlled valve is open. The float controlled valve is connected through a stem 16 to a crank 17 fast on a rock shaft 17', and the shaft 17' has fast upon it a float carrying crank (not shown) which floats upon the surface of the water in a float chamber 18. The float chamber communicates with the evaporator above and below the water level through pipes 19 and 20.

The rate of flow of water through the conduit 3 is increased and diminished within narrow limits in accordance with the temperature of the water flowing through the conduit 11'. A thermo-responsive element is located in the conduit 11' and comprises a bulb 21 filled with a suitable expanding fluid such as alcohol. The bulb 21 of the thermo-responsive element is connected through capillary tubing 22 with suitable valve operating mechanism of known construction located in a chamber 23. The valve operating mechanism conrols a valve located in a housing 24, the housing 24 being interposed in the conduit 3. Instead of locating the thermo-responsive element 21 in the conduit 11', as described, the element may be located in the air cooling chamber beyond the spray as shown at the left in Fig. 1. In the former arrangement if the water flowing into conduit 11' is above a predetermined temperature the valve in the chamber 24 will be moved to a more open position to increase the rate of water flow slightly, and if the water in the conduit 11' is below the desired temperature the valve will be moved toward closed position to impede the flow. Since the temperature of the water in the conduit 11' depends upon whether the system is properly adjusted to the thermal load, the rate of water flow is thus made to increase or diminish slightly as increased or diminished refrigeraton is required.

The same kind of result is secured when the thermo-responsive element is located in the cooling chamber. A rise of temperature causes the valve to be moved to a more open position, while a drop in temperature causes the valve to be moved toward closed position so that the rate of water flow is dependent upon the relation of the thermal load to the magnitude of the water refrigeration applied by the evaporator.

The evaporator is evacuated by means of three steam ejectors 25, 26 and 27. Two of these ejectors namely 25 and 26, are manually controllable and may be normally in continuous operation under heavy load conditions, but the ejector 27 is made automatically responsive to the rate of flow of the water in the conduit 4 so that it will be automatically operated intermittently in accordance with the requirements. Steam is supplied to all three ejectors from a steam main 28, being delivered to the ejectors 25, 26 and 27 through pipes 29, 30 and 31, respectively. Manually operable valves 32 and 33 are interposed in the pipes 29 and 30, so that either or both of the ejectors 25 and 26 may be cut out of operation when required. The ejectors 25, 26 and 27 communicate with the top of the evaporator tank 8 through pipes 34, 35 and 36. Manually operable valves 37 and 38 are interposed in the pipes 34 and 35 so that any ejector which is manually rendered inoperative may also be cut off from communication with the evaporator tank. The closing of these valves 37 and 38 avoids the application of the evaporator vacuum to the chamber of a condenser 39 to which the associated ejector discharges. This prevents circulation through the condenser and back to the evaporator which would reheat the water in the evaporator and load the ejector unnecessarily by providing a short circulating path.

The steam pipe 31 leading to the ejector 27, and the pipe 36 connecting the ejector 27 with the evaporator tank 8, are both equipped with valves, and these valves are maintained under the automatic control of a flow-meter 39 which is responsive to the rate of water flow in the conduit 4 as shown in Fig. 4. An orifice plate 40 is interposed in the conduit 4 so as to provide a pressure drop in the conduit dependent on the rate of water flow. Tubes 41 and 42 communicate with the conduit below and above the orifice plate, respectively, and communicate with one another through a manometer tube 43 which is partly filled with mercury 44. A mercury cup 45 of relatively large cross section is interposed between the tube 42 and the tube 43 so that a change of the pressure difference at the opposite sides of the orifice plate 40 is reflected principally in a rise or fall of the mercury in the leg 46 of the manometer tube 43.

The leg 46 has an enlarged upper end 47 in which a sealing insulating block 48 is secured by means of a threaded ring 49. The block carries conductive terminals 50 and 51 from which conductive rods 52 and 53 extend downward into the leg 46. The rod 53 extends farther down than the rod 52. A conductive terminal 54 in a branch 56 of the manometer tube is connected through a conductor 57 with one terminal of a battery 58. The other terminal of the battery is connected through a conductor 59 with a winding 60 of a solenoid 61. The other end of the solenoid winding 60 is connected to branched conductors 62 and 63, the latter conductor being connected to the terminal 50. The terminal 51 is connected through a conductor 64 with a switch 65. These structures are clearly shown in Figs. 5 and 6.

When the mercury in the leg 46 stands below the lower end of rod 53 no circuit is closed and no current flows from the battery 58. When the mercury rises to the level shown in Fig. 4, it makes contact with the rod 53 but still no circuit is closed. When the mercury rises further so as to engage the rod 52 a circuit is closed through 57, 54 the mercury in the manometer, the rod 52, terminal 50, conductor 63, winding 60, and conductor 59. This acts to draw the switch 65 to a closed position against a conductive terminal 66 of the conductor 62 and thus closes a circuit from the battery through the rod 51 which will stay closed after the mercury leaves contact with the rod 52 and until it leaves contact with the rod 53. When the solenoid 61 is energized by a flow of battery current it closes a switch 67 to connect conductors 68 and 69 of a valve operating circuit. The conductor 69 is connected to one terminal of a current supply line and the conductor 70 is connected to the opposite terminal of the current supply line.

The conductors 68 and 70 are connected to opposite terminals of a valve operating solenoid 71 which solenoid when energized opens the valve in the steam pipe 31 of the ejector 27. When the solenoid is de-energized the valve is closed by a spring (not shown).

Branch lines 72 and 73 connect the conductors 68 and 70 respectively with opposite terminals of a valve operating solenoid 74 for opening the valve located in the pipe 36. The valve is returned to closed position by means of a spring (not shown) when the solenoid is de-energized.

The increased refrigeration of the machine produced by the operation of the ejector 27 will be in excess of the refrigeration required at the particular load and hence when the ejector has been in operation for a short time the temperature responsive element or elements 21 will be cooled, and the rate of flow in the conduit 4 will be impeded, with the result that the ejector 27 will be automatically cut out of operation after a time.

The rate of water delivery to the air cooling chambers may be confined to very narrow limits by making the rods 52 and 53 of almost equal lengths. Since extremely fine regulation is not of practical importance, and since such regulation would involve very frequent starting and stopping of the ejector 27, it is preferable to make the rod 53 enough longer than the rod 52 to provide a substantial lag, so that the ejector will be caused to operate for a substantial length of time whenever it is set into operation.

Provision is desirably made for chemically treating the cooling water to neutralize impurities picked up from the air, such as sulphides and carbonates, so as to avoid the damaging effect which such substances would have on the mercury in the manometer. The water is also maintained sufficiently pure to avoid its acquiring any objectionable conductive characteristics.

Provision is made of a plural stage condenser for condensing the ejector operating steam and the evaporated water. The condenser comprises tanks 39, 75 and 76. A water cooling system is provided for cooling these condensers, this system being entirely distinct from the water cooling system previously referred to for cooling the air. The condenser cooling system comprises a conduit 77 for carrying water from a cooling tower to the condenser tank 39 and branch conduits 78 and 79 for delivering a portion of this water to the tanks 75 and 76. Partition plates 80 in opposite ends of the tank 39 divide the tank into end manifolds for the cooling water and bound an intervening condensing space. Numerous pipes 81 extend across the condensing space for conducting the cooling water from the intake manifold to the outlet manifold of the tank 39. The construction of the tanks 75 and 76 is similar to that of the tank 39 in this respect. The cooling water is returned to the tower through a conduit 82 which communicates with the outlet manifold of the tank 39. Branch conduits 83 and 84 deliver water from the outlet manifolds of the tanks 76 and 75 to the conduit 82. A pump (not shown) is interposed in the conduit 77, in accordance with common practice, for driving the water to the tower.

The tank 39 discharges to a common condensing chamber of the condensing tank 75, being connected thereto to pipes 87, 88 and 89. The condenser tank 76 is divided into upper and lower chambers by means of a horizontal partition plate 90, and the uncondensed vapor from the tank 75 is delivered to the upper chamber of the tank 76 through a pipe 91 by means of an ejector 92 which is supplied with steam through a pipe 93. The uncondensed vapor from the upper chamber of the tank 76 is in turn delivered to the lower chamber through a pipe 94 by means of an ejector 95 supplied with steam from a steam pipe 96. The lower chamber of the tank 76 is at atmospheric pressure and hence the water and any uncondensed vapor may be permitted to escape by gravity through a vent 97.

It will be appreciated, of course, that the highest vacuum, or in other words the lowest absolute pressure, is maintained in the evaporator 8 and that the pressure in the condenser tank 39 is higher than that in the evaporator although still sub-atmospheric. The pressure in the tank 75 is substantially the same as that in the tank 39, while the pressure in the upper compartment of tank 76 is higher than that in the tank 75 but below atmospheric pressure. Finally the pressure in the lower compartment of tank 76 is the same as the pressure of the atmosphere.

Provision is made of suitable means, not shown, for withdrawing the condensate from the several condenser chambers through ports 39' and 75' (Fig. 2).

The embodiment disclosed in Fig. 7 is in general like that of Fig. 1, and hence corresponding parts have been designated by the same reference numerals with the subscript "c" added. These parts will not be described in detail again. The Fig. 7 embodiment, however, involves certain features not present in the embodiment of Fig. 1.

In Fig. 7 the thermo-responsive element 11c is mounted in the conduit 10c, making the arrangement a little more compact than the other construction. The flow meter control device 39c is mounted in the conduit 12c where it is wholly uninfluenced by pump pulsations.

The condensing space of condenser tank 39c is divided into separate compartments by partition plates 85 and 86. Each of the ejectors 25c, 26c and 27c discharges into one of the compartments. Pipes 89c, 88c and 87c connect the respective compartments of tank 39c with the condenser tank 75c.

There is no valve provided in the pipe 36c but instead a valve is provided in the pipe 87c which connects the tank 75c with the chamber of the tank 39c to which the ejector 27c discharges. This prevents circulation through the idle condenser chamber and back to the evaporator which would reheat the water in the evaporator and load the ejector unnecessarily, by providing a short circuiting path. Manually operable valves 98 and 99 are also provided in the pipes 88c and 89c so that any compartment of the tank 39c which is rendered inoperative may be similarly shut off from communication with the tank 75c.

Figure 3:
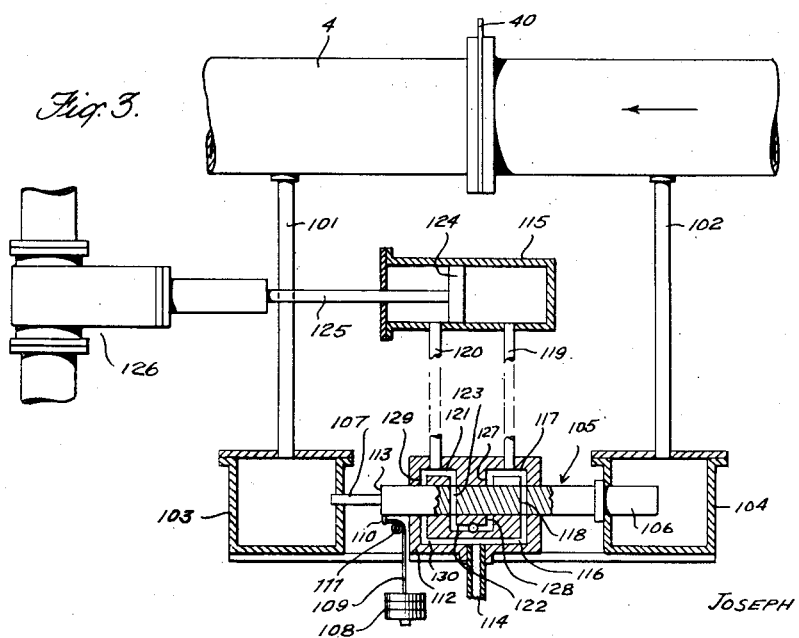
Fig. 3 is a fragmentary, detail view in sectional elevation illustrating a form of mechanism for mechanically controlling one or more valves.

In Fig. 3 disclosure is made of a mechanical valve operating means which may be used in lieu of the manometer and the electrical valve operating means disclosed in Figs. 1, 4, 5, 6 and 7.

Pipes 101 and 102 are connected to the conduit 4 at opposite sides of the orifice plate 40 and communicate respectively with chambers 103 and 104. A piston 105 has a large head 106 disposed in the chamber 104 and a relatively small head 107 disposed in the chamber 103. A weight 108 is connected through a flexible cable 109 with a projection which is provided on the piston 105 adjacent the reduced head 107. The cable 109 runs upon a pulley 111 mounted on a valve body 112. The pressure per unit area of the liquid in the pipe 102 is greater than the pressure per unit area in the pipe 101, and the piston head 106 is of larger area than piston head 107. The piston would, therefore, normally be thrust to its left hand limit of movement with the shoulder 113 in engagement with a face of the chamber 103 were it not for the balancing effect of the weight 108.

With the parts in the positions shown in Fig. 3 a pipe 114 which communicates with a source of compressed air or other suitable motive fluid is placed in communication with the right hand end of a cylinder 115 through passages 116 and 117 formed in the valve body 112, a passage 118 formed in the piston body, and a pipe 119. At the same time the left hand end of the cylinder 115 is vented to the atmosphere through a pipe 120, passages 121 and 122 in the valve body 112, and a passage 123 in the piston body.

A piston 124 in the cylinder 115 is thrust toward the left under the conditions described above to draw toward the left a piston rod 125. Movement of piston rod 125 toward the left serves to close a valve mounted in a valve housing 126.

When the rate of flow of the liquid in the conduit 4 increases, the pressure difference at opposite sides of the orifice plate 40 increases and as a consequence the piston 105 is thrust toward the left to move the passage 118 out of alignment with the passages 116 and 117 and into alignment with passages 127 and 128, thus placing the right hand end of cylinder 115 in communication with the atmosphere. At the same time the passage 123 is moved out of alignment with the passages 121 and 122 and into alignment with passages 129 and 130 to place the left hand end of cylinder 115 in communication with the pressure pipe 114. The piston 124 is thereupon thrust toward the right to open the valve in the housing 126. When the rate of flow of the liquid in the conduit 4 drops, the piston 105 will again travel toward the right and reestablish the connections shown in Fig. 3 to cause the valve in the housing 126 to be closed.

The mechanism described may be used for operating a plurality of valves just as the electrical connections of Fig. 1 operate a plurality of valves. This may be accomplished in a very simple manner by running branches from the pipes 119 and 120 to the opposite ends of another cylinder like the cylinder 115 for actuating another piston like the piston 124.

I have described what I believe to be the best embodiments of my invention. I do not wish, however, to be confined to the embodiments shown, but what I desire to cover by Letters Patent is set forth in the appended claims.

I claim:

1. In an air conditioning system having an air cooling chamber, in combination, means for circulating a cooling liquid in heat exchanging relation with the air in said chamber, thermoresponsive valve means for varying the rate of delivery of the cooling liquid to the chamber within narrow limits, means for refrigerating the cooling liquid, and means responsive to the rate of flow of the cooling liquid and controlling the refrigerating means, for increasing the rate at which heat is extracted from the liquid sufficiently to lower the temperature of the delivered liquid when the rate of flow is slightly increased.

2. In an air conditioning system having an air cooling chamber, and means for circulating a cooling liquid in heat exchanging relation with the air in said chamber, in combination, means for refrigerating the cooling liquid, comprising an evaporator and a plurality of steam ejectors arranged to operate upon the evaporator, means responsive to a thermal load condition for automatically setting one of the steam ejectors into operation and disabling it to change the temperature of the refrigerated liquid as the thermal load is increased and diminished, a plurality of distinct condenser chambers to which the steam ejectors discharge, respectively, a subsequent condenser to which all of said chambers discharge, and means for automatically disconnecting from the subsequent condenser the chamber to which the automatically controlled ejector is arranged to discharge when said ejector is disabled.

3. In an air conditioning system having an air cooling chamber, in combination, means for circulating a cooling liquid in heat exchanging relation with the air in said chamber, means for automatically varying the rate of delivery of the cooling liquid to the chamber within narrow limits in accordance with but less than in unison with variations in the thermal load, means for refrigerating the cooling liquid comprising a plurality of liquid refrigerating devices arranged to work simultaneously, and means for automatically cutting one of the devices into and out of operation to vary to an exaggerated degree the temperature of the refrigerated liquid in relation to variations of liquid flow as the rate of liquid flow is increased and diminished, comprising means for setting the device into operation when the rate of flow increases to a predetermined value, and for disabling the device when the rate of flow falls below a predetermined, lower value.

4. In an air conditioning system having an air cooling chamber, in combination, means for circulating a cooling liquid in heat exchanging relation with the air in said chamber, means for automatically varying the rate of delivery of the cooling liquid to the chamber within narrow limits in accordance with but less than in unison with variations in the thermal load, means for refrigerating the cooling liquid comprising a plurality of liquid refrigerating devices arranged to work simultaneously, and means for automatically cutting one of the devices into and out of operation to vary to an exaggerated degree the temperature of the refrigerated liquid in relation to variations of liquid flow as the rate of liquid flow is increased and diminished, comprising means in the liquid circulating system for producing a pressure drop dependent in value upon the rate of liquid flow, means for measuring the pressure difference thus produced and responsive to said pressure difference, and means responsive to said measuring means for controlling the refrigerating device.

5. In an air conditioning system having an air cooling chamber, in combination, means for circulating a cooling liquid in heat exchanging relation with the air in said chamber, means for automatically varying the rate of delivery of the cooling liquid to the chamber within narrow limits in accordance with but less than in unison with variations in the thermal load, means for refrigerating the cooling liquid comprising a plurality of liquid refrigerating devices arranged to work simultaneously, and means for automatically cutting one of the devices into and out of operation to vary to an exaggerated degree the temperature of the refrigerated liquid in relation to variations of liquid flow as the rate of liquid flow is increased and diminished, comprising means in the liquid circulating system for producing a pressure drop dependent in value upon the rate of liquid flow, means comprising a manometer tube for measuring the pressure difference thus produced and responsive to said pressure difference, and an electrical circuit adapted to be closed by the rise of the conductive liquid in one leg of the manometer above a predetermined level and to be opened by the fall of said liquid.

6. In an air conditioning system having an air cooling chamber, in combination, means for circulating a cooling liquid in heat exchanging relation with the air in said chamber, means for automatically varying the rate of delivery of the cooling liquid to the chamber within narrow limits in accordance with but less than in unison with variations in the thermal load, means for refrigerating the cooling liquid comprising a plurality of liquid refrigerating devices arranged to work simultaneously, and means for automatically cutting one of the devices into and out of operation to vary to an exaggerated degree the temperature of the refrigerated liquid in relation to variations of liquid flow as the rate of liquid flow is increased and diminished, comprising means in the the liquid circulating system for producing a pressure drop dependent in value upon the rate of liquid flow, means comprising a manometer tube for measuring the pressure difference thus produced and responsive to said pressure difference, and an electrical circuit adapted to be closed by the rise of the conductive liquid in one leg of the manometer above a predetermined level and to be opened by the fall of said liquid, below a predetermined lower level.

7. In an air conditioning system having an air cooling chamber, in combination, means for circulating a cooling liquid in heat exchanging relation with the air in said chamber, means for automatically varying the rate of delivery of the cooling liquid to the chamber within narrow limits in accordance with but less than in unison with variations in the thermal load, means for refrigerating the cooling liquid comprising a plurality of liquid refrigerating devices arranged to work simultaneously, and means for automatically cutting one of the devices into and out of operation to vary to an exaggerated degree the temperature of the refrigerated liquid in relation to variations of liquid flow as the rate of liquid flow is increased and diminished, comprising means in the liquid circulating system for producing a pressure drop dependent in value upon the rate of liquid flow, means for measuring the pressure difference thus produced and responsive to said pressure difference, and means mechanically controlled by said measuring means for controlling the refrigerating device.

8. In an air conditioning system having an air cooling chamber, in combination, means for circulating a cooling liquid at a nearly constant rate, substantially equal to the maximum rate for which the system is designed, in heat exchanging relation with the air in said chamber, means for automatically slightly varying the rate of flow of the cooling liquid to the chamber within predetermined limits in accordance with but less than in unison with variations in the thermal load requirements, means for refrigerating the cooling liquid, and flow responsive means for automatically increasing to an exaggerated degree in relation to the increase in rate of flow, the rate at which heat is extracted from the liquid to cause the refrigeration rate to exceed the thermal load when the rate of flow of the cooling liquid exceeds a predetermined value.

9. In an air conditioning system having a plurality of air cooling chambers, in combination, means for circulating a cooling liquid in heat exchanging relation with the air in said chambers, comprising branch conduits individual to the chambers and a main conduit delivering to the branch conduits, thermo-responsive, throttling means individual to the branch conduits and the chambers and governed respectively by the thermal loads of the chambers for controlling the rate of delivery of the cooling liquid to each chamber and thereby affecting the rate of flow in the main conduit in accordance with but less than in unison with variations in the combined thermal loads, means for refrigerating the cooling liquid, and means responsive to the rate of flow of the cooling medium in the main conduit for increasing the liquid refrigeration to an exaggerated degree in relation to the change in the rate of flow.

10. In an air conditioning system having a plurality of air cooling chambers, in combination, means for circulating a cooling liquid in heat exchanging relation with the air in each chamber comprising branch conduits individual to each chamber and common delivery and return main conduits common to the chambers a thermo-responsive element individual to each chamber and disposed in the liquid circulating system to be exposed to the cooling liquid after the liquid has cooled the air in the chamber, a valve controlled by said element for regulating the rate of flow of the cooling liquid to the associated chamber in the branch conduit individual thereto and each affecting the rate of flow in the main conduits in accordance with but less than in unison with variations in the combined thermal loads, means for refrigerating the cooling liquid, and a device responsive to the rate of flow of the cooling liquid in one of the main conduits for varying the temperature of the refrigerated liquid in an exaggerated degree with respect to variations in the rate of flow.

11. In an air conditioning system having an air cooling chamber, in combination, means for circulating a cooling liquid at a nearly constant rate in heat exchanging relation with the air in said chamber, means for refrigerating the cooling liquid comprising an evaporator and a plurality of steam ejectors arranged to operate upon the evaporator, and means responsive to a thermal load condition for automatically setting one of the steam ejectors into operation and disabling it to change the temperature of the refrigerated liquid as the thermal load is increased and diminished.

12. In an air conditioning system having an air cooling chamber, in combination, means for circulating a cooling liquid at a nearly constant rate in heat exchanging relation with the air in said chamber, temperature responsive valve means for automatically slightly varying the rate of flow of the cooling liquid to the chamber in accordance with but less than in unison with the thermal load requirements, means for refrigerating the cooling liquid, and means responsive to the rate of flow of the cooling liquid to the chamber and controlling the refrigerating means for automatically increasing the rate at which heat is extracted from the liquid sufficiently to exceed the thermal load when the rate of flow of the cooling liquid exceeds a predetermined value.

JOSEPH M. SPERZEL.